April 11, 1944.   A. D. GARRISON   2,346,481
DETERMINATION OF UNDERGROUND STRATA
Filed Nov. 27, 1940
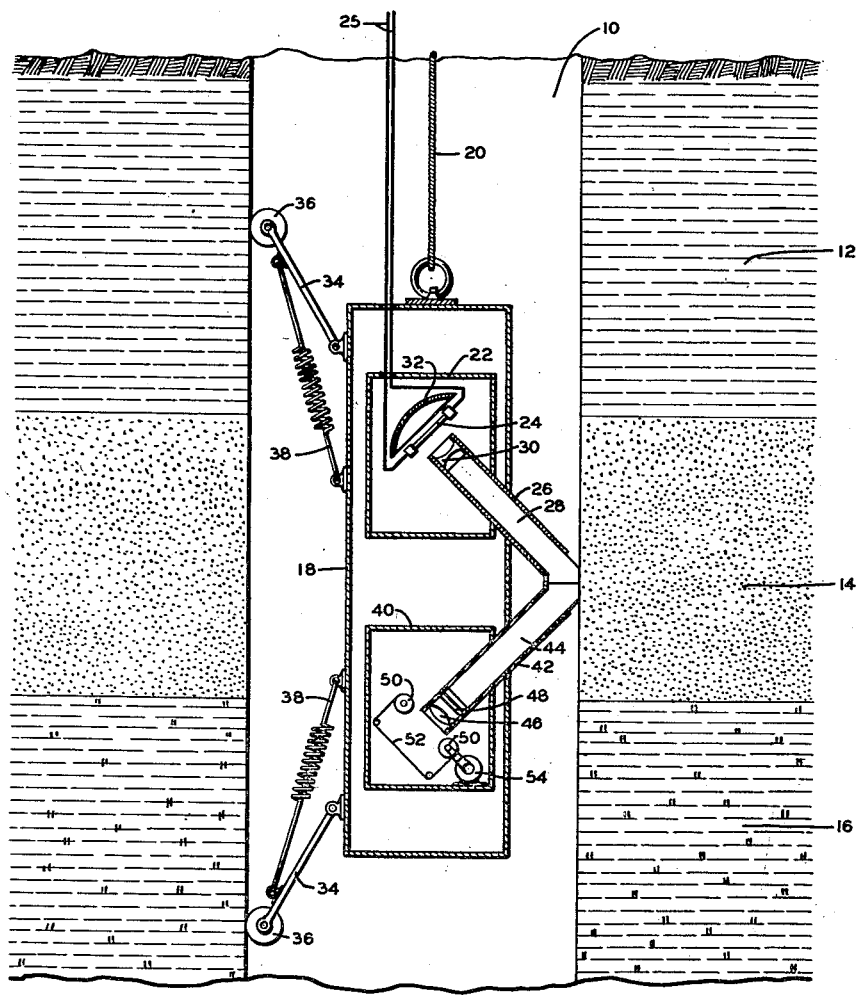
ALLEN D. GARRISON
INVENTOR
BY
HIS ATTORNEYS Patented Apr. 11, 1944

2,346,481

UNITED STATES PATENT OFFICE 2,346,481

DETERMINATION OF UNDERGROUND STRATA

Allen D. Garrison, Houston, Tex., assignor to Texaco Development Corporation, New York, N. Y., a corporation of Delaware Application November 27, 1940, Serial No. 367,433

5 Claims. (Cl. 250—83.6)

This invention relates to subsurface exploration and more particularly to the locating of oil bearing formations traversed by a bore hole. The principal object of the invention is to provide a method of exploration and an apparatus which can be lowered through a bore hole and which will provide continuous indications of the nature of the strata traversed by the hole. The desired information can be obtained in this manner quickly and inexpensively.

Various methods of running underground surveys in order to determine the nature of the strata and particularly the presence and location of oil bearing formations have been proposed and some of these methods are being used with more or less success. In accordance with one of these methods which has been proposed, sample cores are cut during the drilling of the hole and these cores are subsequently subjected at the surface to ultra-violet light, after which determinations are made of the fluorescence of the samples. It is well known that petroleum oils are characteristically fluorescent and thus when an earth sample is found which possesses this characteristic even to a slight degree, it may be assumed that petroleum oil is present in the sample.

Obviously the cutting of cores is a time consuming and an expensive procedure, but the older methods necessitate these cores being cut and removed to the surface before any analysis can be made. In accordance with the present invention a method and an apparatus are provided whereby a continuous survey may be made from top to bottom of the walls of a bore hole without any necessity for cutting and removing core samples.

In carrying out the invention an instrument comprising a housing containing a source of ultra-violet light is lowered through the hole and the light is caused to strike the wall of the hole as the housing is lowered. The housing also contains means for photographically recording the fluorescence which may be caused on the walls of the hole by the ultra-violet light. In this manner it is merely necessary to start the camera or other photographic means and to lower the housing into and through the hole in order to secure a continuous record of the nature of the formations on a moving strip of film.

For a more complete description of the invention reference may be had to the accompanying drawing which is a sectional elevation through a portion of a bore hole showing the instrument as it is being moved through the hole.

With reference to the drawing, a bore hole 10 is shown as having been drilled through earth formations 12, 14 and 16. These formations may or may not contain petroleum oil and if so, the oil may be present in varying amounts ranging from a mere trace to a substantially saturated condition.

A housing 18 is adapted to be lowered and raised through the hole by means of a suitable wire line or cable 20. Disposed within one portion of the housing 18 and preferably within a separate housing or container 22, is a suitable source of ultra-violet light, such as the mercury vapor tube 24, which may be connected to a suitable source of electrical supply (not shown) at the surface, by means of a cable or wires 25.

Projecting from a point in front of the light source 24 and outwardly through the housings 18 and 22 is a tube 26 forming a covering for a bar or rod 28 of a suitable transparent substance, such as quartz. One or more condensing lenses 30 are preferably placed in the inner end of the quartz bar 28 and a suitable reflector 32 is mounted back of the light source. In this manner rays of the ultra-violet light are directed through the quartz bar 28 out of the housing 18 and onto the wall of the hole 10. Means are provided for centering the instrument within the hole and for maintaining it in such a position that the outer end of the quartz bar 28 will contact the solid wall of the formation. One form of device for accomplishing this result is shown in the drawing and this comprises a pair of arms 34 pivoted to the side of the housing 10 and each arm carrying a small wheel 36 adapted to engage the walls of the hole. A pair of tension springs 38 are secured to the arms 34 and the housing 18 and these tend to force the housing to one side so that the end of the quartz bar 28 will engage the walls of the hole. Preferably, two or more sets of the arms and wheels 34 and 36 are secured to the housing 18 to extend radially therefrom so as to aid in centering the device in the hole. It is also preferred that the springs 38 will be of sufficient strength to force the end of the quartz bar 28 through any coating of drilling mud which may adhere to the walls of the hole so that the light passing through the quartz bar will strike directly the solid walls of the hole.

Within the housing 18 and below the container 22 is disposed another container 40 in the side wall of which is mounted another tube 42 covering a second quartz rod or bar 44, the outer end of which is adjacent the end of the bar 28 so that the outer ends of both bars are adapted to contact the formation walls. At the inner end of the tube 42 may be mounted a lens 46 and if desired, a screen or filter 48. Mounted within the container 40 opposite the inner end of the quartz bar 44 is a suitable photographic recording instrument or camera, shown diagrammatically as comprising rolls 50, about which a strip of film 52 may be driven by a suitable motor 54.

In operation the camera motor 54, which may be either a spring motor or electrically driven, is started so as to advance the film 52, and the instrument is placed in the hole 10 and lowered by means of the cable 20. The ultra-violet lamp 24 is, of course, energized and the light therefrom will pass through the quartz bar 28 to impinge on the wall of the hole. In case one of the strata, such as the formation 14 through which the instrument passes, should contain petroleum oil, the wall of the hole 10 in this formation will be excited to fluorescence by the ultra-violet light and the visible light caused by this fluorescence will pass through the quartz bar 44 and lens 46 to the film strip 52, thus causing an indication to be made on the sensitized film. As the instrument is lowered into a stratum which does not contain oil, such as the formation 16, there will be no fluorescence caused by the ultra-violet light and thus no visible light will be directed to the film 52. As the device is lowered through the hole the depth of the instrument is noted or, preferably, recorded at the surface as by measuring the length of the cable 20 in the hole. When the instrument is pulled back to the surface and the film 52 developed, an indication will be had as to the presence of oil bearing formations and, by noting the intensities of the indications on the film strip caused by variations in the intensity of the visible light which passed through the quartz bar 44, a determination can be made as to the probable amount of oil in the formation providing the indication. The photographic record will, of course, be correlated with the record of the depth of the instrument in the hole and thus the exact location of the oil bearing formation or formations can be readily determined. By the provision of a suitable filter 48 or possibly a spectroscopic grating, the nature of the fluorescent substance can be determined. Thus, by using the proper filter or screen, fluorescence from other substance, such for instance, as limestone, can be either eliminaed or caused to provide a different indication from that which would otherwise be caused where the fluorescence occurs in oil bearing formations.

Obviously many modifications and variations of the invention as hereinbefore set forth may be made without departing from the spirit and scope thereof, and therefore only such limitations should be imposed as are indicated in the appended claims.

I claim:

1. A device for locating oil bearing formations traversed by a bore hole comprising a housing adapted to be lowered through the hole, a source of ultra-violet light in said housing, a quartz bar supported by said housing for conducting a beam of said light onto the formation walls, means in said housing for recording variations in fluorescence produced by said light on said walls and a second quartz bar disposed to conduct said fluorescence from said walls to said recording means.

2. A device for locating oil bearing formations traversed by a bore hole comprising a housing adapted to be lowered through the hole, a source of ultra-violet light in said housing, a quartz bar supported by said housing for directing a beam of said light onto the formation walls, means in sad housing for recording variations in fluorescence produced by said light on said walls and a second quartz bar disposed to direct said fluorescence from said walls to said recording means, said recording means comprising a light sensitive film strip and means for moving said film past the inner end of said second quartz rod.

3. A device for locating oil bearing formations traversed by a bore hole comprising a housing adapted to be lowered through the hole, a source of ultra-violet light in said housing, a quartz bar supported by said housing and extending outwardly thereof from said light source to a point on the wall of the hole for directing a beam of said light onto the formation walls, means in said housing for recording variations in fluorescence produced by said light on said walls, a second quartz bar extending into said housing from said point on the hole wall for directing said fluorescence from said walls onto said recording means, means for filtering the light passing from said second quartz bar to said recording means, and resilient means attached to said housing at sides away from the outer ends of said quartz bars for positioning the housing in the hole so that the outer ends of the bars will contact the walls of the hole.

4. A device for locating oil bearing formations traversed by a bore hole, comprising a housing adapted to be lowered through the hole, a source of ultra-violet light in said housing, a quartz bar supported by said housing and extending outwardly thereof for directing a beam of said light onto the formation walls whereby fluorescence is produced on the surfaces of certain of said formations, means in said housing for recording variations in said fluorescence, a second quartz bar disposed to direct said fluorescence from said walls into said housing and onto said recording means, light filtering means between said second quartz bar and said recording means, and means for maintaining the outer ends of the quartz bars in contact with the wall of the hole, said last named means comprising a plurality of arms pivoted to said housing at sides away from the outer ends of said bars and spring means for forcing said arms against the walls of the hole.

5. A device for locating oil bearing formations traversed by a bore hole comprising a housing adapted to be lowered through the hole, a source of ultra-violet light in said housing, a quartz bar supported by said housing and extending outwardly thereof from said light source to a point on the wall of the hole for directing a beam of said light onto the formation walls, means in said housing for recording variations in fluorescence produced by said light on said walls, a second quartz bar extending into said housing from said point on the hole wall for directing said fluorescence from said walls onto said recording means, said recording means comprising a light sensitive film strip and means for moving said film strip past the inner end of said second quartz bar, and a light filter disposed between the inner end of said second quartz bar and said film strip.

ALLEN D. GARRISON.